United States Patent [19]

Yang

[11] Patent Number: 5,292,842

[45] Date of Patent: Mar. 8, 1994

[54] ADHESIVE ACRYLIC COPOLYMERS WITH A BROAD MOLECULAR WEIGHT DISTRIBUTION

[75] Inventor: Henry W. Yang, Kingwood, Tex.

[73] Assignee: Exxon Chemical Patents Inc., Linden, N.J.

[21] Appl. No.: 23,748

[22] Filed: Feb. 26, 1993

Related U.S. Application Data

[63] Continuation of Ser. No. 749,095, Aug. 23, 1991, abandoned.

[51] Int. Cl.⁵ .................. C08F 220/06; C08F 220/10; C08L 31/02; C08L 33/02
[52] U.S. Cl. .................. 526/318.4; 524/556
[58] Field of Search ....................... 526/318.4

[56] References Cited

U.S. PATENT DOCUMENTS

| | | | |
|---|---|---|---|
| 2,809,948 | 10/1957 | Hunter | 260/28.5 |
| 3,032,521 | 5/1962 | Sanderson | 526/318.4 |
| 3,377,298 | 4/1968 | Conort | 260/8 |
| 3,700,456 | 10/1972 | Smith . | |
| 3,929,751 | 12/1975 | Gershberg . | |
| 4,278,575 | 7/1981 | Nakamura et al. | 526/75 |
| 4,477,622 | 10/1984 | Sanderson et al. | 524/522 |
| 4,536,556 | 8/1985 | Tijssen . | |
| 4,588,791 | 5/1986 | Bieringer . | |
| 4,645,711 | 2/1987 | Winslow . | |
| 4,695,608 | 9/1987 | Engler et al. | 525/308 |
| 4,739,008 | 4/1988 | Robinson . | |
| 4,748,217 | 5/1988 | Marhotra . | |
| 4,783,499 | 11/1988 | Padget et al. | 524/519 |
| 4,786,696 | 11/1988 | Bohnel | 526/88 |

FOREIGN PATENT DOCUMENTS

| | | |
|---|---|---|
| 156170 | 10/1985 | European Pat. Off. . |
| 297902 | 1/1989 | European Pat. Off. . |
| 338724 | 10/1989 | European Pat. Off. . |
| 379652 | 8/1990 | European Pat. Off. . |
| 91/02759 | 3/1991 | World Int. Prop. O. . |

*Primary Examiner*—Joseph L. Schofer
*Assistant Examiner*—Wu C. Cheng
*Attorney, Agent, or Firm*—M. B. Kurtzman; C. L. Bell

[57] ABSTRACT

Acrylic copolymer PSA compositions having enhanced peel strength without substantially decreasing shear properties have been formulated by producing the copolymer with a broad molecular weight distribution such that the ratio $M_w/M_n$ is above 6, preferably above 10. The alkyl (meth)acrylate and (meth)acrylic acid monomers are emulsion polymerized over a temperature profile wherein the difference between the maximum and minimum polymerization temperatures is at least about 40° C. and less than about 70° C., preferably using a redox initiator system such as bromate/bisulfite.

24 Claims, 1 Drawing Sheet

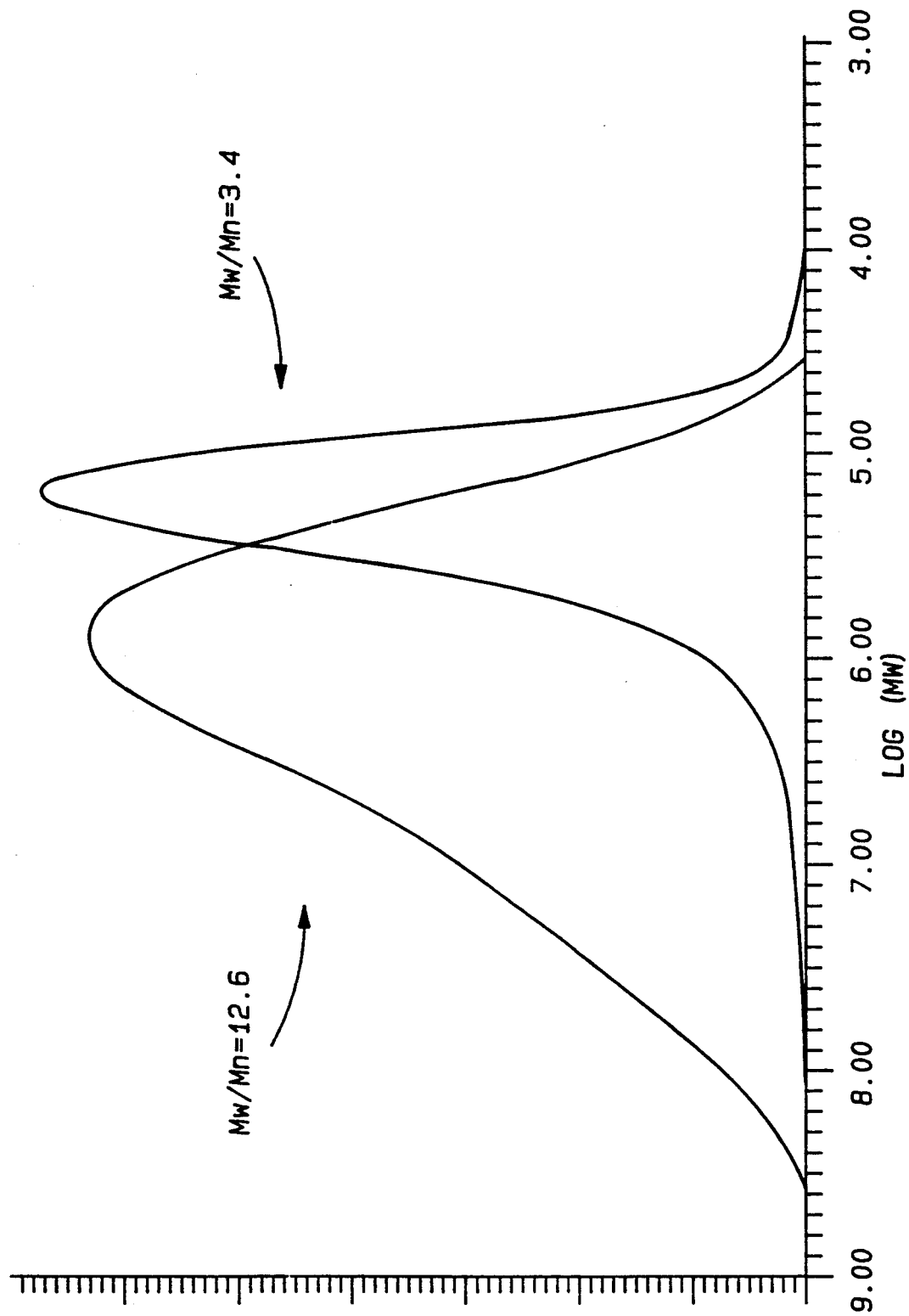

ADHESIVE ACRYLIC COPOLYMERS WITH A BROAD MOLECULAR WEIGHT DISTRIBUTION

This is a continuation, of application Ser. No. 749,095, filed Aug. 23, 1991, abandoned.

FIELD OF THE INVENTION

This invention relates to acrylic copolymers, and more particularly to pressure sensitive adhesive (PSA) compositions based on acrylic copolymers having a broad molecular weight distribution to enhance their adhesive performance.

BACKGROUND OF THE INVENTION

According to the "Glossary of Terms Used in the Pressure Sensitive Tape Industry," a pressure sensitive adhesive (PSA) is a material which is aggressively and permanently tacky, adheres without the need of more than finger pressure, exerts a strong holding force, and has sufficient cohesiveness and elasticity that it can be removed from substrates without leaving a residue.

Low $T_g$ acrylic copolymers are being used as PSAs. Such copolymers have usually been prepared by emulsion polymerization of acrylic monomer mixtures through free radical initiation. Copolymers made by this process usually have molecular weight distributions, $M_w/M_n$, in the range of 2–4 as measured by gel permeation chromatography (GPC). While the resulting adhesive is often satisfactory to obtain certain properties, such as tackiness and peel strength on substrates such as polyester or stainless steel, certain properties are generally found to be deficient, particularly the holding power on these same substrates. Previously, increasing the peel strength of acrylic copolymers to a value greater than 2.0 pounds per inch generally caused the holding power (1 kg over one inch square on stainless steel) to diminish to below 40 hours. Attempts to increase the holding power to over 40 hours, however, resulted in a peel strength lower than 2.0 pounds per inch. In practical applications, it is desirable to maintain a high holding power while improving the peel strength, particularly when the PSA is to be used to prepare an adhesive tape.

Various polymerization techniques have been attempted to prepare satisfactory acrylic polymer emulsions. For example, in Japanese Patent J-51125472, a petroleum resin emulsion is obtained by polymerizing vinyl monomers in the presence of petroleum resins having softening points of from 40° to 160° C., an average molecular weight of 300 to 3000, and an acid value and saponification value of less than 1. The monomers include, for example, alkyl (meth)acrylates, vinyl acetates, vinyl chlorides, styrene, acrylonitrile, and acrylic acid. The emulsified mixture is then reacted in an emulsion polymerization reaction to form a shelf-stable emulsion adhesive. The resin emulsion produced is described as having fine particle sizes and ample stability and when cured, the films produced have excellent water resistance and gloss.

Also, U.S. Pat. No. 4,645,711 to Winslow et al. describes the incorporation of hydrocarbon resins from many sources, i.e., from hydrogenated resin esters, polyterpene, polymerized alkyl styrene, and polymerized petroleum-derived monomer resins, into PSA tape compositions where the adhesive is a polymerized acrylic emulsion. The patent describes physically mixing the resin with the polymer emulsion.

Numerous approaches have been used to produce resin emulsions. One approach is to dissolve the resin in a hydrocarbon solvent, combine the resin solution and water to form an emulsion, and strip the solvent. Invariably some residual hydrocarbon solvent remains in the finished emulsion which is undesirable in certain applications. This has led to the development of solvent-free dispersions (see U.S. Pat. No. 2,809,948) and emulsions (see U.S. Pat. No. 3,377,298) of petroleum resins. In both of these formulations, ionic emulsifiers have been utilized. In the former, a mixture of cationic and nonionic surface active agents is used to achieve a resin emulsion, and in the latter an ionic surfactant is used in combination with an aqueous gel of a swelling earth to produce an emulsion paste of a petroleum resin. These resin emulsions have been commercially used to tackify natural rubber, carboxylated styrene-butadiene and acrylic latexes for many adhesive applications.

The art is also replete with various polymerization techniques intended to improve other properties of polymers obtained through either redox initiation or temperature ramping during polymerization. For example, in U.S. Pat. No. 3,700,456 to Smith, there is described the preparation of a photographic silver halide emulsion by emulsion polymerization of acrylate and other unsaturated monomers with a redox initiator wherein the oxidant is bromate or chlorate and the reductant is bisulfate. Other examples of bromate-sulfite, -bisulfite and -metabisulfite polymerization redox initiators are found in U.S. Pat. No. 3,929,751 to Gershberg (polyacrylamide); U.S. Pat. No. 4,748,217 to Malhotra (polytetrafluoroethylene); and U.S. Pat. No. 4,739,008 to Robinson et al. (water-in-oil biphase polymerization).

In U.S. Pat. No. 4,588,791 to Bieringer et al., vinyl chloride was suspension polymerized with an ascending temperature control to produce a polyvinyl chloride said to have a broad molecular weight distribution. The polyvinyl chloride product was said to exhibit improved flowability for injection molding and to produce injection molded articles having smooth, transparent surfaces.

In U.S. Pat. No. 4,536,556 to Tijssen et al., there is described the emulsion polymerization of α-methylstyreneacrylonitrile copolymers with a free radical initiator and a chain transfer agent wherein the temperature increases over the course of the polymerization. This technique is said to maintain monomer conversion rates at a maximum and to improve heat resistance.

Accordingly, there still remains a need for improvements in the procedures used to prepare an acrylic copolymer in the form of a latex-like dispersion for application as a PSA having increased peel strength without serious decrease in shear. As mentioned above, there has generally been a decrease in shear properties associated with modifications made in an effort to obtain an increase of peel strength and tackiness. There is a need to improve the peel strength of PSAs while yet maintaining high shear properties and thus obviating the decline in shear usually resulting from variations intended to increase peel strength.

SUMMARY OF THE INVENTION

It has been discovered that acrylic copolymers having a relatively broad molecular weight distribution have enhanced adhesive properties, such as, for example, when the acrylic copolymer is applied as an emulsion to a substrate. The copolymer may, for example, have a balance of peel strength (e.g. a PSTC-1 peel strength above about 2 lb/in.) and shear properties (e.g. a PSTC-7 holding power above about 50 or even 100 hours). These copolymers can be prepared by copolymerizing the acrylic monomers over a relatively wide temperature range.

In one aspect, the present invention provides an acrylic copolymer. The copolymer has a $T_g$ of from about $-70°$ C. to about $+10°$ C., preferably from about $-60°$ C. to about $-10°$ C., and a ratio of $M_w/M_n$ (measured by GPC) of at least about 6, preferably at least about 10 and especially from about 10 to about 50. The copolymer is generally prepared from a monomer mixture including from about 0 to about 50, preferably from about 10 to about 35, percent by weight of a lower alkyl (meth)acrylate, from about 25 to about 99, preferably from about 60 to about 88, percent by weight of an upper alkyl (meth)acrylate and from about 1 to about 15, preferably from about 2 to about 6, percent by weight of (meth)acrylic acid. The acrylic copolymer can also include one or more of acrylonitrile, vinyl acetate, vinylidene chloride, styrene and methyl styrene.

In another embodiment of the present invention, a method for preparing an acrylic copolymer comprises emulsion polymerizing an acrylic monomer mixture over a temperature profile wherein the difference between the minimum and maximum polymerization temperatures ($\Delta T$) is from about $40°$ C. to about $70°$ C. The monomer mixture comprises from about 1 to about 15 percent by weight, preferably from about 2 to about 6 percent by weight of a (meth)acrylic acid, from 0 to about 50 percent by weight, preferably from about 10 to about 35 percent by weight of a lower alkyl (meth)acrylate ester, from about 25 to about 99 percent by weight, preferably from about 60 to about 88 percent by weight of an upper alkyl (meth)acrylate.

In another aspect, the invention provides an adhesive latex emulsion. The emulsion comprises up to about 70 percent by weight, preferably from about 30 to about 70 percent by weight, of an acrylic copolymer of from 0 to about 50 percent by weight of a lower alkyl (meth)acrylate, from about 25 to about 99 percent by weight of an upper alkyl (meth)acrylate and from about 1 to about 15 percent by weight of (meth)acrylic acid, wherein the copolymer has a ratio of $M_w/M_n$ of at least about 6, preferably at least about 10 and especially from about 10 to about 30. The acrylic copolymer has a $T_g$ of from about $-70°$ C. to about $10°$ C., preferably from about $-60°$ C. to about $-10°$ C., and is preferably prepared by emulsion polymerization of the monomers.

The polymer latex, when coated onto a suitable substrate such as flexible polyester or polyolefin film dries into a pressure sensitive adhesive (PSA) having enhanced peel strength while maintaining shear properties, including high temperature shear properties. Thus, in a further embodiment, the present invention comprises a pressure sensitive adhesive-coated article comprising a substrate having a coating of the acrylic copolymer on a surface thereof. In a preferred embodiment, the acrylic copolymer in the coating comprises from about 1 to about 15 percent by weight, preferably from about 2 to about 6 percent by weight of a (meth)acrylic acid, from 0 to about 50 percent by weight, preferably from about 10 to about 35 percent by weight of a lower alkyl (meth)acrylate ester, from about 25 to about 99 percent by weight, preferably from about 60 to about 88 percent by weight of an upper alkyl (meth)acrylate ester. The copolymer coating has a $T_g$ from about $-70°$ C. to about $10°$ C., preferably from about $-60°$ C. to about $-10°$ C. The PSA coating of the present invention is ideally suited for PSA tape applications. Substrates may be metallic, paper, plastic or cloth.

In yet a further embodiment, the present invention is a laminate article comprising at least two layers of material bonded by the aforedescribed adhesive.

BRIEF DESCRIPTION OF THE DRAWING

The Figure compares the molecular weight distributions for a broad molecular weight distribution acrylic copolymer prepared according to the present invention (Example 1 (Sample C); $M_w/M_n = 12.6$) and a typical acrylic copolymer synthesized by a conventional emulsion polymerization technique (Comparative Example 1 (Sample I); $M_w/M_n = 3.4$).

DETAILED DESCRIPTION OF THE INVENTION

Vinyl monomers used in the practice of this invention are those which are polymerizable by free radical reactions, preferably those materials generally described as acrylics, e.g. alkyl (meth)acrylates and (meth)acrylic acid and typically including a component from both (meth)acrylic acid and alkyl (meth)acrylate ester. The terms "acrylics" or "acrylic polymer" or "acrylic monomer" denote a generalized material comprising in greatest proportion either an $\alpha,\beta$-ethylenically unsaturated carboxylic acid, a hydrocarbyl ester of an $\alpha,\beta$-ethylenically unsaturated carboxylic acid or a mixture thereof. The term "(meth)acrylate" refers to either a methacrylate or an acrylate. The term "(meth)acrylic acid" refers to either methacrylic acid or acrylic acid. Mixtures of several different alkyl (meth)acrylates are usually included, affecting the final properties of the copolymer composition. These acrylate monomer mixtures generally comprise lower alkyl (meth)acrylates having to 4 carbon atoms in the alkyl group of the ester, and upper alkyl (meth)acrylates having 5 or more carbon atoms in the alkyl group of the ester, usually up to about 14 carbon atoms, but preferably from five to about eight carbon atoms. Another preferred monomer component is (meth)acrylic acid.

Some preferred examples of acrylic monomers are as follows: acrylic acid, methacrylic acid, crotonic acid, maleic acid, itaconic acid, methyl (meth)acrylate, ethyl (meth)acrylate, propyl (meth)acrylate, 2-ethylhexyl (meth)acrylate, n-butyl (meth)acrylate. Other vinyl monomers which can be employed include acrylonitrile, vinyl acetate, vinylidene chloride, styrene, methyl styrene, and the like. The monomer mixture should contain from 1 to about 15 percent by weight, preferably about 2 to about 6 percent by weight of the (meth)acrylic acid; 0 to about 50 percent by weight, preferably about 10 to 35 percent by weight, lower alkyl (meth)acrylate; and from about 25 to 99 percent by weight, preferably from 60 to about 88 percent by weight upper alkyl (meth)acrylate. It should be noted that some acrylic monomer mixtures commercially available include minor amounts of acrylonitrile, styrene, or vinyl acetate, and the like.

The acrylic copolymers o the present invention have, as previously mentioned, a relatively broad molecular weight distribution, i.e., the ratio of weight average molecular weight to number average molecular weight ($M_w/M_n$) is large. These disperse polymers should have a ratio of $M_w/M_n$ high enough to enhance their adhesive properties. Although not intending to be bound by theory, it appears that the shear adhesion properties of the acrylic copolymers are favored by the presence of relatively high molecular weight fractions (tending to produce a relatively high $M_w$), whereas the peel adhesion properties are sensitive to the presence of a low molecular weight fraction (tending to produce a relatively low $M_n$). By having both high and low molecular weight species as reflected in a high ratio of $M_w/M_n$, the acrylic copolymer obtains an excellent balance between shear and peel adhesion properties. Preferably, the ratio of $M_w/M_n$ is at least about 6, and more preferably at least about 10. The upper limit on the ratio is set primarily by polymerization practicalities since it is desirable to produce high molecular weight species which are essentially free of gel. The lower limit of $M_n$ corresponds to a sufficient degree of polymerization for internal strength, and $M_n$ is preferably at least about 10,000. Thus, ,in the practice of this invention, there is no particular upper limit on the $M_w/M_n$ that can be obtained.

For the preparation of the PSAs which are an embodiment of the present invention, the polymerized composition should have a suitable glass transition temperature ($T_g$). Accordingly, $T_g$ is another important criterion for determining composition of the monomer solution in terms of monomer selection and concentration. $T_g$ of the copolymer product ranges from about −70° C. to about 10° C. for PSA application, preferably from about −60° C. to about −10° C. If the glass transition temperature is too high, ambient temperature tackiness required for standard PSA applications is not generally obtained. The glass transition temperature of the product is usually a function of the glass transition temperature of the component monomer homopolymers. Thus, to achieve the low $T_g$, it is generally necessary to avoid excessive amounts of high $T_g$ monomers such as (meth)acrylic acid and lower (meth)acrylates, as well as the high $T_g$ materials such as styrene, acrylonitrile and the like.

Generally the reaction of the selected acrylic monomers to form acrylic copolymers proceeds by aqueous emulsion polymerization which is a type of polymerization well known to the practitioners in the art. The reaction mixture generally includes an initiator which may be any compound(s) or source for generating free radicals capable of initiating polymerization of the acrylic monomers, such as, for example, azo compounds, persulfates, redox couples and the like. Preferred are the redox couples having a polymerization initiation temperature below about 60° C., i.e. between about −40° C. and about 60° C., especially between about −30° C. and about 30° C., particularly those including an oxidant such as bromate or chlorate ion from any suitable source, e.g. sodium, potassium or ammonium bromate or chlorate, and a reductant such as bisulfite ion from any suitable source, e.g. sodium or potassium bisulfite or metabisulfite. The redox couple potassium bromate/sodium metabisulfite is particularly preferred because it is capable of generating free radicals to initiate polymerization at low temperatures, e.g. 0°-10° C. The redox couple in approximately stoichiometric proportions is generally present at from about 0.01 to about 1 part per 100 parts by weight of monomer in the reaction mixture.

The process generally includes water to adjust the solids content of the emulsion. In some instances it may be advantageous to buffer the pH of the solution between about 4 and about 7 by including some well known buffering agent such as, for example, sodium bicarbonate, potassium hydrogen phthalate and the like.

A surfactant is normally used to aid in the formation of monomer-in-water emulsion and to act as a suspending agent for the solids in the final copolymer, which are dispersed in the aqueous medium both during and after the polymerization, but this should not be considered a limitation on the invention. The surfactants useful in the practice of this invention are well known and are present in quantities sufficient to place the reactants in the emulsion prior to reaction and maintain the product in suspension after the reaction. Of particular applicability are a blend of anionic and nonionic surfactants having a hydrophile-lipophile balance (HLB) of from about 14 to 42, especially from about 35 to about 40. Especially preferred is the widely used disodium sulfosuccinate as an ionic surfactant and ethylene oxide adducts of nonyl phenol as nonionic surfactants. While the ranges of surfactants are well known, the amount will preferably range from about 1 to about 5 parts, normally 2 to 4 parts per 100 parts of the monomers, by weight.

The molecular weight of such copolymers is normally controlled by a commonly known mono-olefin chain transfer agent in the polymerization mixture. It is preferred hat the monomers be dispersed into a water medium to form an emulsion at ambient temperatures just by stirring in the presence of a satisfactory surfactant. The reaction mixture thus formed, including the initiators, must be placed in a reaction vessel, evacuated of oxygen by purging with nitrogen or other inert gas, and the polymerization reaction conducted with stirring in the sealed container under a nitrogen or other inert gas blanket.

The addition of the monomers is normally carried out intermittently and over a period of time. For example, about 5-25, preferably 10-20 percent, by weight of the monomer solution, may be initially metered into the reaction mixture and polymerized for a short period of time at a relatively low temperature, preferably from 0° C. to about 30° C., e.g. ambient temperature. Normally when this is accomplished, the solids content of the reaction should preferably be about 20 to 22 percent by weight, which is a benchmark solids content. Once the selected solids level is attained, the balance of the monomer solution is evenly metered into the reaction vessel over a period of time, usually 3 to 6 hours, depending upon the size of the reactor and quantity to be added, while gradually and/or stepwise increasing the polymerization temperature. Once the addition of the monomer mixture is complete, the polymerization is allowed to continue, usually for about another hour while maintaining the reaction temperature within the range of from about 45° C. to about 90° C., preferably between about 50° C. and 80° C. The polymerization continues until the total solids content of the material in the reactor reaches its theoretical level based upon the amount of reactants charged to the reaction mixture, usually in practice about 45 to 55 percent by weight, but the overall solids content may be as high as 70 percent by weight. While there is no theoretical lower limit, a practical lower limit of about 30 percent by weight solids content is recognized by those skilled in the art. In a commercial sense, the highest limits attainable are preferred.

The difference between the minimum and maximum polymerization temperature ($\Delta T$) should be at least about 40° C. to obtain the desired molecular weight distribution. The upper limit on the polymerization $\Delta T$ is determined largely by practical considerations. For example, the minimum polymerization temperature must be equal to or above the freezing point of the polymerization medium and the activation temperature of the catalyst; the maximum polymerization temperature must likewise be below the boiling point of the reaction medium (which may be pressurized) and the copolymer degradation temperature. The polymerization ΔT is preferably between about 40° C. and 70° C.

Once the reaction is complete, the solids, in the form of a dispersed polymer latex, is allowed to cool to room temperature and the dispersed polymer latex is usually separated from coagulum formed during polymerization by filtration. In the practice of this invention, a 200 mesh "sock" filter has been found satisfactory.

In addition, the acrylic polymer emulsion may optionally include from about 10 to about 100 parts of a tackifier per 100 parts by weight of the copolymer, and preferably from about 20 to about 60 parts per 100 parts by weight of the copolymer. The tackifier may be added to the emulsion before or after polymerization of the monomers. Tackifier resins useful in the present invention are generally well known and are defined as natural resins and thermoplastic petroleum hydrocarbon resins obtained by polymerization, in the presence of a catalyst of the Friedel-Crafts type, of steam-cracked petroleum distillates, boiling in the range between about 30° C. and 280° C., or any fraction of these distillates boiling within the said range, or of polymerized mixtures of olefins and diolefins. However, since suitable adhesive properties can be achieved by the present invention, the use of the tackifier and its concomitant difficulties and complexities can be preferably avoided so that the copolymer is essentially free thereof. A copolymer produced by this invention may be cross-linked by any means well known in the art.

The latex product can be coated on a substrate film for use as a tape, for example. The coated substrate is typically dried by circulating hot air at 100° C. to 110° C. for 2 to 5 minutes. Those skilled in the art readily recognize other processing parameters for such coated substrate. The dried and cured latex coating of the present acrylic copolymer emulsions produces an adhesive film suitable for PSA application. Suitable substrates include metallic, plastic, paper, cloth materials and the like. Examples of metallic substrates include aluminum, copper and steel and examples of the plastic substrates include polyesters, polyolefins, polyethylene terephthalate, and the like.

In certain embodiments of the practice of this invention, the adhesives formed find application as nonpressure sensitive adhesives such as, for example, laminating adhesives, binders for woven and nonwoven fabrics and binders for pressed wood production. For example, embodiments useful as laminating adhesives have high peel strength but low shear properties. Such adhesives can be used to join two or more sheets of material together such as joining a layer of wood or a multiple layer of wood to form a plywood product.

The foregoing invention having now been described, the following examples are to further teach the preferred embodiment and best modes for practicing the described invention and to aid others in the practice of the scope of such invention herein provided.

EXAMPLE I

This example illustrates the synthesis of acrylic copolymer emulsions having a broad molecular weight. The ingredients charged into the reactor are summarized in Table 1 below.

TABLE 1

| Parts (wt) | Component |
| --- | --- |
| | A. Initial Charge: |
| 24.0 | Buffer Solution (50 parts of 0.1M potassium hydrogen phthalate and 36.6 parts of 0.1M NaOH) |
| 0.1 | IGEPAL CO-850, an ethylene oxide adduct of nonyl phenol (sold by GAF) |
| 0.2 | Sodium bicarbonate |
| 0.5 | Potassium bromate |
| | B. Monomer Mixture: |
| 22.0 | Buffer Solution (50 parts of 0.1M potassium hydrogen phthalate and 36.6 parts of 0.1M NaOH) |
| 3.16 | EMCOL K-8300, an anionic surfactant (manufactured by Witco Chemical) |
| 37.5 | 2-Ethylhexyl acrylate |
| 10.5 | Ethyl acrylate |
| 2.0 | Acrylic acid |
| | C. Initiator Feed |
| 2.5 | Sodium metabisulfite |
| 20.0 | Buffer Solution (50 parts of 0.1M potassium hydrogen phthalate and 36.6 parts of 0.1M NaOH) |

A 2-liter, four-neck reaction flask equipped with a stirrer, condenser, a thermosensor, and a monomer addition tube was purged with nitrogen for 15 minutes. The initial charge (A) was placed in the flask with stirring at room temperature and continued nitrogen purging for an additional 20 minutes.

The monomer mixture (B) was prepared in a separate vessel by adding a mixture of the monomers to the premixed buffer solution and K-8300 using a homogenizer. When the initial charge (A) and the monomer mixture (B) were equilibrated to ambient temperature, 15 percent by weight of the homogenized monomer mixture (B) was charged to the flask. Simultaneously, the initiator feed (C) was begun pumping into the flask at 0.1 ml/min until an exotherm of 5° C. was observed, and the polymerization continued for 30 minutes without additional initiator feed (C). The total solids at the end of the 30 minutes was 20-22 percent by weight. When the total solids reached this range, the remaining monomer mixture (B) was evenly metered into the flask at 2 ml/min, and initiator feed (C) addition was resumed at 0.1 ml/min. The reaction was allowed to continue during monomer and initiator addition at room temperature for one hour, but the initiator feed (C) addition was stopped as necessary to prevent any exotherm from exceeding 5° C.

The reactor was then heated to 40° C. and initiator addition resumed until a 5° C. exotherm was observed. After one hour polymerization at 40° C., the reactor was heated to 55° C. and initiator addition again resumed until a 5° C. exotherm was observed. After one hour polymerization at 55° C., the reactor was heated to 65° C. and initiator addition again resumed until a 5° C. exotherm was observed. During these procedures the progress of the polymerization was monitored by periodically checking the solids content, and if polymerization was not continuing and the initiator feed was exhausted, a newly prepared solution was used. After addition of the monomer was completed, the polymerization was allowed to continue at 65° C. for two more hours, and the flask cooled to room temperature. Stirring was continuous throughout the procedures.

The final total solids was about 50 percent by weight, particle size, 150–250 nm, and Brookfield viscosity, 500–1000 cp. The coagulum content of about 2 percent of the total reactants charged was removed by filtration. Sample C had a $M_w/M_n$ of 12.6.

The polymer latex prepared as described above was knife-coated on a Mylar film and dried in an air circulating oven for three minutes at 110° C. The dried adhesive coating was approximately 1.5 mils thick. The adhesive was bonded to a stainless steel surface for PSA performance tests. Peel (180°) adhesion was obtained using Test No. PSTC-1 of the Pressure Sensitive Tape Council. Shear was determined according to PSTC-7. The shear adhesion failure temperature (SAFT) test was similar to the shear test except that the test temperature was increased at the rate of 10° F. per 15 minutes. The temperature at which shear failed is reported as SAFT. Both SAFT and shear were tested at 1 square inch and 1000 gram hang weight.

PSA performance is very sensitive to the molecular weight of the polymer. A chain transfer agent (CTA) such as t-dodecanethiol is commonly used to control the molecular weight and to demonstrate the sensitivity. Table 2, below, summarizes the PSA test results for Samples A–E which were synthesized according to the above procedures, but with varying amounts of chain transfer agent added to the last 85% of the monomer mixture (B).

TABLE 2

| Sample | CTA (wt %)[1] | Ball Tack (cm) | Loop Tack (lb/in.) | 180° Peel (lb/in.) | SAFT (°F.) | Shear (hours) |
|---|---|---|---|---|---|---|
| A | 0.0 | 4 | — | 1.1 | 290+ | 100+ |
| B | 0.05 | 4 | 1.6 | 2.1 | 290+ | 100+ |
| C[3] | 0.075 | 15 | 2.0 | 2.3 | 290+ | 57 |
| D | 0.10 | 5 | 2.8 | 3.1 | 111 | 2 |
| E | 1.0 | 4 | — | 3.3[2] | 98 | 0.5 |

[1] t-Dodecanethiol on a basis of last 85% of monomer shell.
[2] Cohesive failure.
[3] $M_w/M_n = 12.6$.

It is seen from the data in Table 2 that the broad molecular weight distribution acrylic copolymers of the present invention can be prepared with an excellent balance of tack, peel and shear. Note in particular Sample B having a peel of 2.1 lb/in., a holding power in excess of 100 hours and a SAFT in excess of 290° F.

COMPARATIVE EXAMPLE

To illustrate the effect of the polymerization temperature profile on the acrylic copolymer properties, the polymerization procedures of Example 1 were repeated except that the polymerization was conducted isothermally at 65° C. with the recipe given in Table 3.

TABLE 3

| Parts (wt) | Component |
|---|---|
| | A. Initial Charge: |
| 24.0 | Water |
| 0.1 | IGEPAL CO-850, an ethylene oxide adduct of nonyl phenol (sold by GAF) |
| 0.2 | Sodium bicarbonate |
| 0.05 | Sodium persulfate |
| | B. Monomer Mixture: |
| 24.2 | Water |
| 3.16 | EMCOL K-8300, an anionic surfactant (manufactured by Witco Chemical) |
| 37.5 | 2-Ethylhexyl acrylate |
| 10.5 | Ethyl acrylate |
| 2.0 | Acrylic acid |

TABLE 3-continued

| Parts (wt) | Component |
|---|---|
| 0.05 | Sodium persulfate |

The same equipment and general emulsion polymerization procedure described in the preceding Example was used for this Comparative Example. The initial charge (A) was heated in the reactor to 65° C. and 15 wt % of the monomer mixture (B) was added and allowed to polymerize for 30 minutes to obtain a total solids contact of about 17–19 wt %. The remaining monomer mixture (B) was then metered in at approximately 2 ml/min. After the monomer mixture (B) addition was finished (approximately 4 hours), the reaction was continued for an additional 2 hours and cooled to room temperature. The resultant latex was then filtered and evaluated for PSA performance as above. Various levels of CTA (t-dodecanthiol) were added to the last 85% of the monomer mixture (B) addition to compare the effects of molecular weight variation. The results are presented in Table 4.

TABLE 4

| Sample | CTA (wt %)[1] | Ball Tack (cm) | 180° Peel (lb/in.) | SAFT (°F.) | Shear (hours) |
|---|---|---|---|---|---|
| F | 0.0 | 5 | 1.1 | 290+ | 100+ |
| G | 0.025 | — | 1.1 | 290+ | 100+ |
| H | 0.050 | — | 1.5 | 290+ | 18 |
| I[3] | 0.075 | — | 1.7 | 112 | 3 |
| J | 0.10 | 4 | 3.7[2] | 110 | 0.4 |

[1] t-Dodecanethiol on a basis of last 85% of monomer shell.
[2] Cohesive failure.
[3] $M_w/M_n = 3.4$.

In contrast to the broad temperature range-polymerized Example, the isothermally polymerized Comparative Example produced materials which had either poor adhesion (Samples F and G) and/or poor shear (Samples H, I and J). The adhesion and shear properties could not be balanced as in the Sample B and C materials of the above Example.

The molecular weight distribution of the Comparative Example (Sample I, $M_w/M_n = 3.4$) is shown in the Figure with the same distribution for Example 1 (Sample C, $M_w/M_n = 12.6$) prepared with the same relative proportions of chain transfer agent. From these data it is seen that the polymerization over a temperature profile in accordance with the present invention obtains a broad molecular weight acrylic copolymer which has improved PSA performance in contrast to an isothermally prepared acrylic copolymer of the same monomer composition.

As is apparent from the foregoing description, the materials prepared and the procedures followed relate to specific embodiments of the broad invention. It is apparent from the foregoing general description and the specific embodiments that, while predictive forms of the invention have been illustrated and described, various modifications can be made without departing from the spirit and scope of this invention. Accordingly, it is not intended that the invention be limited thereby.

I claim:

1. A pressure sensitive adhesive comprising an acrylic copolymer comprising:
from about 10 to about 50 percent by weight of lower alkyl acrylate, said lower alkyl having 1 to 4 carbon atoms, from about 25 to about 88 percent by weight of an upper alkyl acrylate, said upper alkyl having 5 to 14 carbon atoms, and from about 1 to about 15 percent by weight of a acrylic acid, said copolymer having a unimodal Gaussian type molecular weight distribution of at least about 6 with a minimum Mn of about 10,000.

2. The acrylic copolymer of claim 1, wherein the acrylic copolymer further comprises one or more of acrylonitrile, vinyl acetate, vinylidene chloride, styrene and methyl styrene.

3. The acrylic copolymer of claim 1, having a $T_g$ from about $-70°$ C. to about $+10°$ C.

4. The acrylic copolymer of claim 1, wherein $M_w/M_n$ is at least about 10.

5. The acrylic copolymer of claim 1, which has been crosslinked.

6. A pressure sensitive adhesive latex emulsion, comprising:
an acrylic copolymer comprising about 10 to about 50 percent by weight of a lower alkyl acrylate, said lower alkyl having 1 to 4 carbon atoms, from about 25 to about 88 percent by weight of an upper alkyl acrylate, said upper alkyl having 5 to 14 carbon atoms, and from about 1 to about 15 percent by weight of acrylic acid, said copolymer having an $M_w/M_n$ ratio of at least about 6 defined by a Gaussian distribution curve, and having a Tg of from about $-70°$ C. to about $10°$ C. and is essentially from of gel.

7. The adhesive latex emulsion of claim 6, further comprising from about 10 to about 100 parts by weight of a tackifier per 100 parts by weight of said copolymer, in an aqueous admixture therewith.

8. A pressure sensitive adhesive latex emulsion, comprising:
an acrylic copolymer essentially free of gel, comprising:
from about 10 to about 50 percent by weight of a lower alkyl acrylate, said lower alkyl having 1 to 4 carbon atoms, from about 25 to about 88 percent by weight of an upper alkyl acrylate, said upper alkyl having from 5 to 14 carbon atoms, and from about 1 to about 15 percent by weight of acrylic acid, said copolymer having an $M_w/M_n$ defined by a Gaussian distribution curve of at least about 6, a Tg of from about $-70°$ C. to about $10°$ C., said copolymer being produced under emulsion polymerization conditions in the presence of a redox polymerization initiator having an inititation temperature between about $-40°$ C. to about $80°$ C.

9. The acrylic copolymer of claim 1 wherein the lower alkyl acrylate is present from about 10 to 35 percent by weight, the upper alkyl acrylate is present from about 60 to about 88 percent by weight and acrylic acid present from about 1 to about 6 percent by weight.

10. An acrylic copolymer having an $M_wM_n$ of at least 6, with a minimum $M_n$ of about 10,000, said acrylic copolymer being obtained by the polymerization of 10 to 50 percent by weight of a lower alkyl (meth) acrylate, from about 25 to 88 percent by weight of an upper alkyl (meth) acrylate and from about 1 to about 15 percent of a (meth) acrylic acid, said lower alkyl having from 1 to 4 carbon atoms, said upper alkyl having from 5 to 14 carbon atoms, with a temperature gradient during polymerization, wherein the difference between the minimum and maximum polymerization temperature is at least 40° C.

11. An acrylic copolymer having an $M_wM_n$ of at least 6, with a minimum $M_n$ of about 10,000, said acrylic copolymer being obtained by the polymerization of 10 to 50 percent by weight of a lower alkyl (meth) acrylate, from about 25 to 88 percent by weight of an upper alkyl (meth) acrylate and from about 1 to about 15 percent of a (meth) acrylic acid, said lower alkyl having from 1 to 4 carbon atoms, said upper alkyl having from 5 to 14 carbon atoms, with a polymerization temperature profile wherein the difference between the minimum and maximum polymerization temperature is at least 40° C., wherein the polymerization takes place in the presence of a redox polymerization initiator, and initiator having an initiation temperature between about $-40°$ C. to about 80° C.

12. An acrylic copolymer having an $M_wM_n$ of at least 6, with a minimum $M_n$ of about 10,000, said acrylic copolymer being obtained by the polymerization of 10 to 50 percent by weight of a lower alkyl (meth) acrylate, from about 25 to 88 percent by weight of an upper alkyl (meth) acrylate and from about 1 to about 15 percent of a (meth) acrylic acid, said lower alkyl having from 1 to 4 carbon atoms, said upper alkyl having from 5 to 14 carbon atoms, under polymerization conditions in the presence of a redox polymerization initiator, said initiator having an initiation temperature between about $-40°$ C. to about 80° C. and a temperature profile wherein the difference between the minimum an maximum polymerization temperature is at least 40° C.

13. The acrylic copolymer of claim 9, wherein the acrylic copolymer also includes one or more of acrylonitrile, vinyl acetate, vinylidene chloride, styrene or methyl styrene.

14. The acrylic copolymer of claim 22, having a $T_g$ from about $-70°$ C. to about 10° C.

15. The acrylic copolymer of claim 9, having a $T_g$ from about $-60°$ C. to about $-10°$ C.

16. The acrylic copolymer of claim 9, wherein $M_w/M_n$ is at least about 10.

17. The acrylic copolymer of claim 9, which has been crosslinked.

18. An acrylic copolymer latex wherein said copolymer has an $M_w/M_n$ of at least 6, said $M_w/M_n$ defined by an unimodal of Gaussian distribution curve, said acrylic copolymer latex being obtained by emulsifying monomers, said monomers comprising about 10 to about 50 percent by weight of a lower alkyl (meth) acrylate, from about 25 to about 88 percent by weight of an upper alkyl (meth) acrylate and from about 1 to about 15 percent by weight of (meth) acrylic acid in an aqueous medium, said lower alkyl having from 1 to 4 carbon atoms, said upper alkyl having from 5 to 14 carbon atoms, polymerizing the emulsified monomers in the presence of a redox polymerization initiator, said initiator having an initiation temperature between about $-40°$ C. to about 80° C.

19. The acrylic copolymer latex of claim 18, wherein said redox polymerization initiator is made up of an oxidant selected from the group consisting of bromate and chlorate ions and a reductant bisulfite ion.

20. The acrylic copolymer latex of claim 18, wherein said initiator is present from about 0.01 to about 1.0 parts per 100 parts by weight of monomer.

21. The acrylic copolymer latex of claim 18, wherein said initiator has an initiation temperature between about $-30°$ C. to about 30° C.

22. The acrylic polymer of claim 18, wherein the polymerization is carried out between about −30° C. to about 30° C.

23. The acrylic polymer of claim 18, wherein the monomers of the polymerization include one or more of the acrylonitrile, vinyl acetate, vinylidene chloride, styrene or methyl styrene.

24. The copolymer of claim 1, wherein the lower alkyl (meth) acrylate is a lower alkyl (meth) acrylate ester and the upper alkyl (meth) acrylate is an upper alkyl (meth) acrylate ester.

* * * * *